United States Patent Office 3,647,640
Patented Mar. 7, 1972

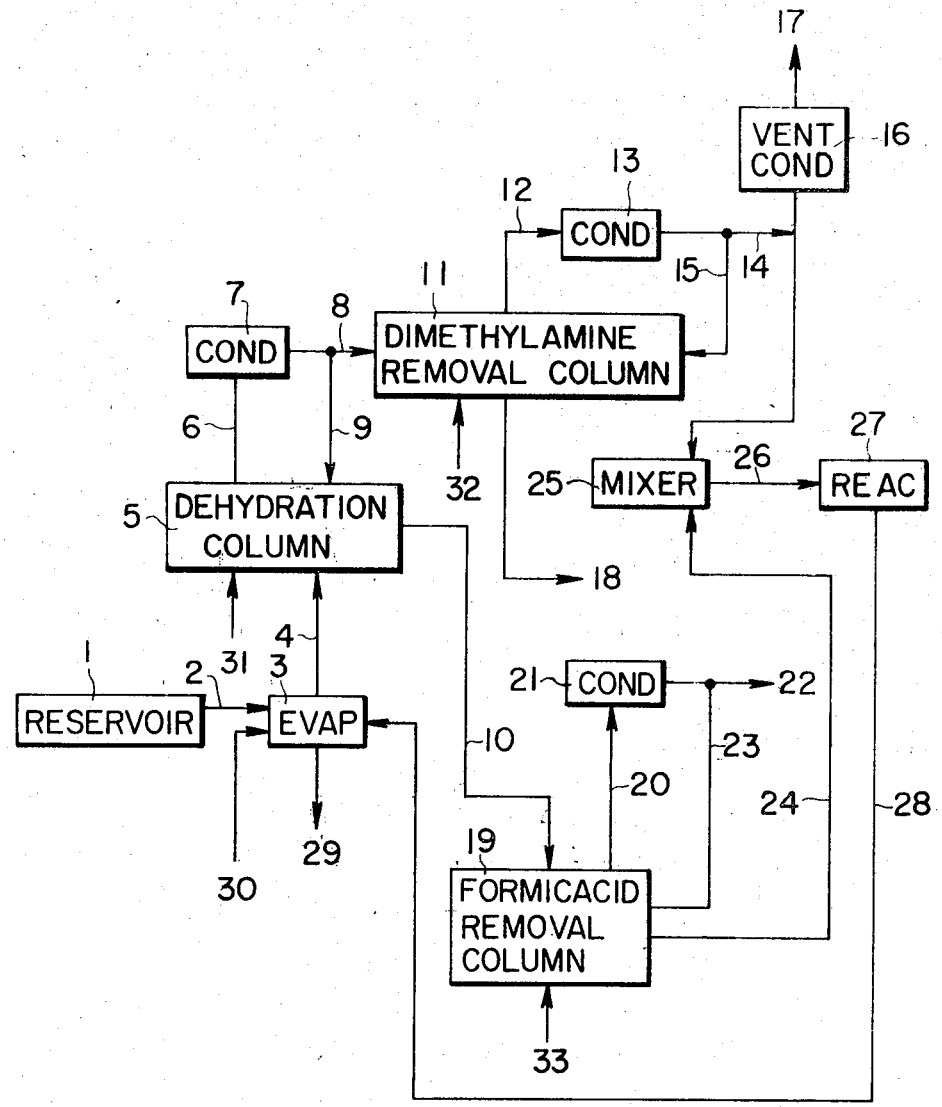

3,647,640
PROCESS FOR RECOVERING DIMETHYLFORMAMIDE BY DISTILLATION WITH DIMETHYLAMINE ADDITION
Hideo Matsuzawa, Hirotoshi Itoh, and Teruhiko Yoshioka, Hiroshima, Japan, assignors to Mitsubishi Rayon Company, Ltd., Tokyo, Japan
Filed Mar. 31, 1970, Ser. No. 24,177
Claims priority, application Japan, Apr. 17, 1969, 44/29,933; May 31, 1969, 44/42,786
Int. Cl. B01d 3/34; C07c 97/16
U.S. Cl. 203—38                                       13 Claims

ABSTRACT OF THE DISCLOSURE

Dimethylformamide is recovered from the mixture containing formic acid by adding dimethylamine to the mixture and heating the mixture at a temperature between 90° C. and 180° C. to resynthesize dimethylformamide.

BACKGROUND OF THE INVENTION

Field of the invention

This invention relates to a process for recovering dimethylformamide from crude dimethylformamide which contains formic acid as an impurity.

Description of the prior art

Dimethylformamide (hereinafter abbreviated "DMF") is well known as an excellent solvent for a large number of organic compounds and has been used, for example, in the purification of mineral oils, the extraction of petroleum fractions, the separation of acetylene from olefins, and as a particularly good solvent for polyacrylonitrile, polyurethane, and the like. For many of these applications, it is important that the DMF be recovered and purified as completely as possible so that it can be continuously reused for greatest utilization and economy.

However, it is difficult to effect complete recovery and purification of DMF due to the nature of the impurities. For instance, when DMF is used as a solvent in the spinning process for forming acrylic fibers, such as polyacrylonitrile fibers, the DMF is usually contaminated with water during the wash steps. Formic acid and dimethylamine are usually formed as contaminants by decomposition of DMF during the spinning operations. In order to reuse the DMF, these impurities should be as completely removed as possible. Where complete purification is required, however, the recovery ratio often must be sacrificed to an unacceptable degree. Where distillation is used to purify the recovered crude DMF, the DMF must be heated in a hydrated state. However, in this condition, hydrolysis is accelerated and large amounts of formic acid and dimethylamine are frequently formed so that the recovery ratio of purified DMF is undesirably reduced.

In order to recover DMF from water-containing DMF by distillation, it has been suggested to effect distillation under reduced pressure to suppress the hydrolysis of the DMF. Even under these conditions, however, it is impossible to completely inhibit hydrolysis. Furthermore, reduced pressure distillation requires such a large diameter distillation column, that construction costs are prohibitive. Moreover, since low temperature steam is used in a reduced pressure distillation column, its effective utilization as a heat source is reduced.

Although dimethylamine can be removed relatively simply from DMF by distillation, formic acid forms an azeotropic mixture with DMF (containing 31% by weight of formic acid under 760 mm. Hg) and accordingly, distillation is not an effective technique for recovering DMF without encountering severe azeotropic losses with formic acid. In order to overcome these disadvantages, a number different processes have been suggested to remove formic acid, such as by catalytic decomposition, by the addition of an alkali, and by ion exchange with an ion exchange resin. None of these state of the art processes, however, are entirely desirable for commercial purposes since it is necessary to minimize to the greatest possible extent, decomposition of DMF. Moreover, all of these processes remove formic acid in a non-recoverable form and hence, are undesirable.

There is also known a process in which dimethylamine formate formed by the addition reaction of formic acid with dimethylamine is allowed to be present to inhibit the hydrolysis of DMF, thereby increasing the recovery ratio thereof. However, DMF recovered according to this process contains dimethylamine formate and hence is not sufficiently pure to be used as a solvent in many applications, such as in the production of acrylic fibers. That is to say, it is desirable to remove as completely as possible such impurities as formic acid, dimethylamine, water and dimethylamine formate from the DMF before it is reused in the production of acrylic fibers.

SUMMARY OF THE INVENTION

Accordingly, it is an object of this invention to provide a process for recovering high purity DMF in a high recovery ratio from crude DMF containing formic acid.

Another object of this invention is to provide a process for recovering pure DMF in a high yield from crude DMF containing formic acid.

A further object is to provide a process in which DMF is resynthesized from formic acid and dimethylamine formed by the hydrolysis of DMF and then the resynthesized DMF is recovered.

A still further object is to provide a process in which DMF, which has been used in the production of acrylic fibers, can be recovered in a high yield and sufficient purity to be reused in acrylic fiber production.

These and other objects have now herein been attained by adding dimethylamine to the crude DMF, heat treating the resulting mixture to a temperature of greater than 90° C., and preferably from 90° C. to 180° C., and thereafter subjecting the heat treated mixture to DMF recovery.

DETAILED DESCRIPTION OF PREFERRED EMBODIMENTS

The present invention is a process for recovering DMF from crude DMF containing formic acid in an amount of up to that required to form an azeotropic mixture with DMF. According to this process, dimethylamine is added to the crude DMF and the mixture is heat treated at a temperature of from 90° C. to 180° C. in order to resynthesize DMF which can thereafter be readily recovered.

The amount of formic acid contained in the crude DMF used in the present invention is desirably less than the concentration required to form an azeotropic mixture. If the formic acid is present in greater concentrations, it must be greatly decomposed in the heat treatment step so that it becomes practically impossible to maintain a high recovery ratio of DMF. The starting material for the present invention is frequently obtained by distillation of crude DMF which results in the formation of a formic acid-DMF azeotrope. When the starting material is obtained in this manner, it is desirable to prevent as much as possible any decomposition of the formic acid at the bottom of the still during distillation. For this reason, it is desirable that the formic acid concentration be maintained up to 15% by weight, preferably 3–10%. In many instances, the crude DMF may contain water, methanol, ethylene glycol or the like, in addition to formic acid. In order to attain a high recovery ratio of DMF, however, it is desirable that the amount of water contained as an impurity, be maintained in an amount of less than 30% by weight, and preferably less than 10% by weight. The amounts of methanol and ethylene glycol should be contained in amounts of less than 20% by weight.

While a high purity dimethylamine can, of course, be used in the present process, it is most advantageous to use the crude dimethylamine formed by the hydrolysis of DMF. Ordinarily, such crude dimethylamine contains small amounts of water, DMF and other substances, but the presence of such minor amounts of impurities, is not objectionable. Where an exceptionally large amount of water is contained as an impurity, however, the rate of reaction of formic acid with dimethylamine will be reduced and the recovery ratio of DMF will also be correspondingly reduced. Accordingly, it is desirable that the total amount of water in the system be less than 30% by weight, and preferably less than 10% by weight.

It is desirable that a substantially equimolar amount of dimethylamine to formic acid be added to the crude DMF, but it is not objectionable to include more or less dimethylamine with respect to the amount of formic acid present. Where less dimethylamine is used, the rate of reaction of formic acid with dimethylamine will be increased so that the subsequent heat treatment time can be reduced. In this instance, however, unreacted formic acid will remain in a relatively large amount, and the recovery ratio of DMF will be reduced. If, on the other hand, a greater amount of dimethylamine is added to the crude DMF, it will have no effect on the reaction and the recovery ratio of the DMF will not be affected.

During the heat treatment, it is desirable to take precautions to prevent the loss of dimethylamine. For this reason, it is desirable that the heat treatment be effected in a closed system.

The extent of the heat treatment will vary depending upon the temperature, the content of formic acid, and the amount of dimethylamine added. Generally, good results are obtainable with a heat treatment of from several minutes to several hours, and preferably from 30 minutes to 3 hours.

A preferred manner of conducting the present process comprises the following steps:

(1) The crude DMF is separated into a mixed liquid of water and dimethylamine and a mixed liquid of DMF and formic acid by dehydration.

(2) The dimethylamine is separated into dimethylamine and water.

(3) The DMF-formic acid mixture obtained in step (1) is then separated into pure DMF and a DMF-formic acid mixture.

(4) The DMF-formic acid mixed liquid obtained in step (3) is mixed with the dimethylamine obtained in step (2) and the resulting mixture is heated to a temperature of 90° to 180° C. to resynthesize DMF.

(5) The reaction liquid obtained in step (4) is then recycled to step (1).

In the above recovery process, steps (1) to (3) are effected in any of a large variety of distillation columns, such as packed columns, plate columns and the like.

The resynthesis step (4) is ordinarily carried out with a mixer and a reactor, although the mixer may be omitted. The reactor used is desirably one that can be closed and is capable of withstanding moderate to high pressures. In this step, the heat treatment temperature should be greater than 90° C. If the temperature is below 90° C., the resynthesis reaction rate is too slow to attain the advantages of the present invention. For example, if the temperature is 86° C., the conversion of formic acid is less than 60% even when the treatment is effected for 10 hours. Accordingly, the amount of formic acid to be treated in the resynthesis step becomes excessively large. Thus, the use of temperatures below 90° C. is not desirable from an industrial standpoint. Most preferably, the heat treatment temperature is from 120° to 170° C.

In the resynthesis step, formic acid and dimethylamine will react to resynthesize DMF. It is therefore desirable that the formic acid be present in stoichiometrical amounts to the dimethylamine. However, either one of the two may be present in excess. In order to adjust the amounts of the two compounds to stoichiometric proportions, additional dimethylamine other than that obtained in the dimethylamine removal step (2) and/or additional formic acid, other than that obtained in the formic acid removal step (3), may be added from outside sources. In the resynthesis step (4) up to 30% of water may be present, but it is desirable, as far as possible, that the amount of water be maintained at less than 10%. Accordingly, even though the dimethylamine obtained in the dimethylamine removal step (2), often contains some amounts of water, it can be directly used in step (4) unless the quantity of water present is extremely large.

In practicing the above-mentioned recovery process, means, such as an evaporator, should be used for removing solids or high boiling material contained in the crude DMF prior to the dehydration step (1). If the crude DMF contains high boilers, however, in amounts which will not disturb the subsequent steps, these procedures can be eliminated. Where the reaction liquid obtained in the resynthesis step contains high boilers, however, it is desirable that it be recycled to the dehydration step after removing the high boilers.

A preferred embodiment of the present process is illustrated below with reference to the accompanying drawing.

Crude DMF is sent from a reservoir 1 through a pipe 2 to an evaporator 3. The crude DMF is heated by means of a heat source 30, and vaporized components are fed through a pipe 4 to a dehydration column 5. If high boilers have been accumulated in the evaporator 3, they are removed out of the system through a pipe 29.

The dehydration column 5 is heated with a heat source 31. Substantially all of water and dimethylamine are passed through a pipe 6 and condensed in a condenser 7, and a part thereof is refluxed through a pipe 9 to the dehydration column 5 while the other part thereof is fed through a pipe 8 to a dimethylamine removal column 11. The dimethylamine removal column 11 is heated with a heat source 32. Low boilers composed mainly of dimethylamine are passed through a pipe 12 and condensed in a condenser 13, and a part thereof is refluxed through a pipe 15 to the dimethylamine removal column 11 while the other part thereof is fed through a pipe 14 to a mixer 25 in the resynthesis step. Gas components are passed through a vent condenser 16 and removed from the system by means of an exhaust pipe 17. The water separated in the dimethylamine removal column 11 is recovered through a pipe 18.

The formic acid-DMF mixture separated in the dehydration column 5 is fed through a pipe 10 to a formic acid removal column 19. The mixture is heated with a heat source 33 and purified DMF is passed through a pipe 20 and a condenser 21, and recovered from a pipe 22. In this case, a part of the purified DMF is refluxed through a pipe 23 to the formic acid removal column 19. A formic acid-DMF mixture, which is obtained from the bottom of the formic acid removal column and which contains formic acid in an amount equal to or up to that required to form an azeotropic mixture with DMF, is sent through a pipe 24 to a mixer 25 in the resynthesis step which has been kept at about 50° C. The mixed liquid in the mixer 25 is sent through a pipe 26 to a reactor 27 in the resynthesis step, treated at a temperature of 90°–180° C. and then recycled through a pipe 28, an evaporator 3 and a pipe 4 to the dehydration column 5.

Where substantially no high boilers are present in the crude DMF in the reservoir 1 and/or in the reaction liquid from the reactor 27 pipe 2 and /or the pipe 28 may be connected directly to the pipe 4.

In practicing the present invention according to the process shown in the drawing, the evaporator 3, the dehydration column 5, the dimethylamine removal column 11 and the formic acid removal column 19 can be operated according to known processes. In such procedures, the dehydration column and the formic acid removal column are operationd under reduced pressure in order to inhibit the hydrolysis of DMF. In the present invention, however, the hydrolysis of DMF in said steps is not particularly required to be inhibited, and therefore the said columns can be operated at normal pressure, which is advantageous in view of column construction costs.

The decomposition speed of formic acid in the formic acid removal column depends upon the concentration of formic acid in the column and on the temperature. The present process can, however, be conducted even under reduced pressures, so long as the concentration of the formic acid and the temperature are controlled properly.

When using the formic acid removal column of the present invention, it is not desirable to use the prior art distillation process wherein an alkali material is added to remove formic acid.

According to the present process, DMF is recovered in a markedly higher recovery ratio as compared to the prior state of the art processes. This is considered ascribable to the fact that during the heat treatment procedure, the formic acid and the dimethylamine contained in the liquid react with each other to form additional amounts of DMF.

A process for synthesizing DMF from formic acid and dimethylamine has already been reported by Brown in J. Appl. Chem. IS 159 (1951). According to this process, DMF is obtained in a yield of 50% by reacting formic acid with dimethylamine at 5°–10° C. in a methanol solvent in the absence of water.

Experiments conducted by the present inventors show that in DMF at temperatures as low as 5°–10° C., formic acid and dimethylamine scarcely react each other and merely given an addition product, whereas methyl formate and dimethylamine react with each other quite easily to form DMF. It is therefore considered that in Brown's process, the presence of methanol must be a required condition.

The process for producing DMF from formic acid and dimethylamine has not entirely been adopted on a commercial scale, primarily because the starting materials are expensive, the yield is low, a large amount of methanol is required and the recovery and separation of methanol, unreacted formic acid and DMF are difficult. On a commercial scale, DMF is produced from methylamine and carbon monoxide.

A principal object of the present invention, therefore, is to resynthesize DMF from formic acid and dimethylamine which have been formed by the hydrolysis of DMF at the time of use or recovery thereof as a solvent and to recover the resynthesized DMF in a high yield without any substantial loss of the DMF. The fact that such a resynthesis of DMF can be accomplished with a high yield by heating formic acid and dimethylamine to above a specific temperature in the presence of DMF solvent is quite surprising in view of the equilibrium relation between DMF, formic acid, dimethylamine and water. For example, when a mixture comprising 5.0 moles of formic acid, 5.0 moles of dimethylamine, 7.3 moles of DMF and 0.3 mole of water is heat treated in an autoclave at 150° C. for one hour, the conversion of formic acid and dimethylamine is 97% and the selectivity of DMF is substantially quantitative. When the same mixture as above is used except that the amount of water is increased to 6.0 moles, and is heat treated at 150° C. for two hours, the formic acid conversion reaches 95% and the DMF selectivity is substantially quantitative. From this, it should be readily ascertainable that the present process makes it possible to convert 95–97% of the formic acid contained in the crude reactant to DMF. According to the present process, therefore, the loss of DMF due to hydrolysis at the time of use or recovery thereof as a solvent can be reduced almost to zero and thus the recovery ratio of DMF can be greatly increased as compared with that attainable according to any of the conventional state of the art processes.

Advantages attainable by adoption of the present process are as follows:

(a) The loss of DMF due to hydrolysis can be reduced almost to zero, and therefore a high recovery ratio of DMF is attainable.

(b) The distillation and recovery of DMF can be effected at normal pressure or under pressure, so that the distillation column construction costs can be kept at a minimum as compared to conventional reduced pressure processes. Moreover, high temperature steam distilled from the distillation column can now be utilized.

(c) It is not necessary to take special precautions to treat and discard formic acid and dimethylamine which are formed by the hydrolysis of DMF, and thus the problems of polution are minimized.

The present invention, therefore, makes it possible to greatly enhance the economy of commercial scale continuous processes using DMF as a solvent and accordingly, the industrial potential of the present invention is quite significant.

Having now generally described the invention, a further understanding can be obtained by reference to certain specific examples, which are provided herein for purposes of illustration only, and are not intended to be limiting in any manner. Unless otherwise specified, all parts and percentages are intended to mean parts and percentages by weight.

Example 1

To a mixture of 23.2 parts of formic acid and 53.5 parts of DMF was added a mixed liquid of 22.7 parts of dimethylamine and 0.6 part of water, and the resulting mixture was heat treated in an autoclave in a nitrogen atmosphere at 130° C. for two hours. As the result, the conversion of formic acid and dimethylamine was 95 mole percent, and thus the formic acid and dimethylamine consumed in the reaction converted substantially quantitatively to DMF. The heat treated mixed liquid was subjected to distillation to recover 84 parts of DMF, and the recovery ratio of DMF was as high as 93 mole percent.

The recovery ratio was calculated according to the following equation:

Recovery ratio (mole percent)

$$= \frac{\text{moles of recovered DMF}}{(A+B)} \times 100$$

wherein

A is the mole of DMF in crude DMF, and
B is the mole of either formic acid or dimethylamine contained in crude DMF, whichever is less.

During the distillation operation, a small amount of unreacted formic acid was obtained as a mixed liquid comprising 1.16 parts of formic acid and 2.7 parts of DMF which is close to an azeotropic mixture of the two compounds. This mixture, however, may be subjected to the same treatment as above to recover the DMF. Accordingly, when the above process is carried out on a continuous commercial scale, it is possible that the recovery ratio of DMF will be higher than 93 mole percent.

On the other hand, the same mixture as above was subjected to distillation without application of heat whereby substantially all of the DMF formed an azeotropic-residue at the bottom of the still. The recovery ratio of DMF was substantially 0 percent.

The same mixture as above was charged with caustic soda in an amount equivalent to the formic acid in the mixture and then subjected to distillation to attain a DMF recovery ratio of 57.5 mole percent.

Example 2

The same mixture as in Example 1 was heat treated at 150° C. for one hour. As the result, the conversion was 98 mole percent, and DMF was formed quantitatively. The heat treated liquid was subjected to distillation to attain a DMF recovery ratio of 96.7 mole percent.

Examples 3–6

In the same manner as in Example 1, mixtures of the compositions set forth in Table 1 were heat treated and subjected to distillation recovery operation to obtain the results as shown in Table 1.

TABLE 1

| Example No. | Composition of mixture, parts | | | | Treating conditions | | Mole percent | | Amount of recovered DMF (parts) | Recovery ratio (mole percent) |
|---|---|---|---|---|---|---|---|---|---|---|
| | Formic acid | DMF | Water | Dimethyl-amine | Temperature (° C.) | Time (hours) | Conversion | Selectivity | | |
| 3 | 21.2 | 48.8 | 9.4 | 20.7 | 150 | 2 | 95 | Quantitative | 76.6 | 93.2 |
| 4 | 18.8 | 43.4 | 19.4 | 18.4 | 150 | 5 | 5 | do | 66.0 | 90.2 |
| 5 | 16.5 | 37.4 | 30.0 | 16.2 | 170 | 3 | 93 | do | 48.5 | 9.20 |
| 6 | 4.45 | 86.1 | 4.64 | 4.77 | 150 | 2 | 94 | do | 92.8 | 91.6 |

Examples 7–9

In the same manner as in Example 1, mixtures of the compositions set forth in Table 2 were heat treated and subjected to distillation recovery operations to obtain the results as shown in Table 2.

TABLE 2

| Example No. | Composition of mixture, parts | | | | Treating conditions | | Mole percent | | Amount of recovered DMF (parts) | Recovery ratio (mole percent) |
|---|---|---|---|---|---|---|---|---|---|---|
| | Formic acid | DMF | Water | Dimethyl-amine | Temperature (° C.) | Time (hours) | Conversion | Selectivity | | |
| 7 | 23.7 | 50.7 | 0.5 | 21.1 | 100 | 5 | 94% based on dimethylamine. | Quantitative | 73.5 | 82.4 |
| 8 | 23.7 | 50.7 | 0.5 | 21.1 | 130 | 1 | 97% based on dimethylamine. | do | 75.8 | 85.9 |
| 9 | 22.7 | 52.2 | 0.5 | 24.4 | 150 | 1 | 98% based on formic acid | do | 84.9 | 95.9 |

From the results shown in Table 2, it should be readily understood that where dimethylamine is added in a slightly less than equimolar amount than that of the formic acid present in the mixture (Example 8), the heat treatment time may be shorter than where dimethylamine is added in an equimolar amount (Example 1). In the above case, however, the amount of unreacted formic acid becomes greater and accordingly, the amount of DMF left as a residue at the bottom of the still becomes larger, whereby the DMF recovery ratio is lowered. When the process is carried out on a commercial scale, however, the recovery ratio can be increased by recycling the bottom residue to the heat treatment step. Therefore, whether the length of the heat treatment should be made shorter or the amount of the mixture to be treated should be decreased, can be suitably decided as the occasion demands.

Examples 10–11

In the same manner as in Example 1, mixtures of the compositions set forth in Table 3 were heat treated and then subjected to distillation recovery operations to obtain the results as shown in Table 3.

Example 12

The recovery of DMF was effected according to the process shown in the drawing, except that the high boiling material removal step was eliminated.

In the first place, a mixed liquid comprising 99.75 parts of water, 99.00 parts of DMF, 0.629 part of formic acid and 0.617 part of dimethylamine were stored in the reservoir 1. This mixture was fed at a rate of 2 kg./hr. to the dehydration column 5. The dehydration column 5, the dimethylamine removal column 11 and the formic acid removal column 19 were operated under a reduced pressure of 100 mm. Hg.

To the mixer 25 which was under operation at 50° C., a 79.7% aqueous dimethylamine solution obtained from column 11 was fed at a rate of 11.34 g./hr. through pipe 14. Further, a mixed liquid comprising 10% of formic acid, 89.8% of DMF and 0.2% of dimethylamine obtained from column 19, was fed at a rate of 91.98 g./hr. through pipe 24.

The mixture which had left the mixer was fed to reactor 27, kept at 150° C. and reacted for a period of 60 minutes. The composition of the liquid recycled through pipe 28 to dehydration column 5 was 93.53% of DMF, 0.27% of formic acid, 0.28% of dimethylamine and 5.57% of water. This composition corresponds, when calculated on the basis of the formic acid fed through pipe 24 to a conversion of 97 mole percent and a selectivity of 99 mole percent.

As the result of the thus effected operations, 998.6 g./hr. of DMF was recovered through pipe 22 and 998.0 g./hr. of water was recovered through pipe 18.

When calculated according to the aforesaid equation, the recovery ratio of DMF was 99.86 mole percent.

Comparative example

Example 12 was repeated except that the mixer 25 and the reactor 27 were not used. As the result, 901.5 g./hr. of DMF was recovered through pipe 22, and the recovery ratio of DMF was 90.15 mole percent.

TABLE 3

| Example No. | Composition of mixture, parts | | | | | Treating conditions | | Mole percent | | Amount of recovered DMF (parts) | Recovery ratio (mole percent) |
|---|---|---|---|---|---|---|---|---|---|---|---|
| | Formic acid | DMF | Water | Dimethyl-amine | Methanol or ethylene glycol | Temperature (° C.) | Time (hours) | Conversion | Selectivity | | |
| 10 | 19.0 | 44.3 | 0.4 | 18.7 | Methanol, 17.6 | 150 | 1 | 98 | Quantitative | 71.5 | 96.0 |
| 11 | 18.8 | 43.8 | 0.4 | 18.4 | Ethylene glycol, 18.7. | 150 | 1 | 97 | do | 70.1 | 95.2 |

From the results shown in Table 3, it should be readily understood that even when methanol or ethylene glycol, for example, is present, no substantial detrimental effects are brought about during the resynthesis of DMF from dimethylamine and formic acid.

Through pipe 24, a mixture comprising 10% of formic acid, 89.8% of DMF and 0.2% of dimethylamine was recovered at a rate of 91.98 g./hr.

Even if it is assumed that DMF in the mixture obtained through pipe 24 could be completely recovered by neutralizing the formic acid in said mixture with a stoichiometrically equal amount of an aqueous caustic soda solution, the DMF recovery ratio attainable in this comparative example would be 98.4%.

Having now fully described the invention, it will be apparent to one having ordinary skill in the art, that many changes and modifications can be made to the invention without departing from its spirit or scope. Accordingly, what is intended to be covered by Letters Patent is:

1. A process for recovering dimethylformamide from a formic acid-dimethylformamide mixture, wherein the amount of formic acid contained in said mixture is less than that required to form a azeotrope with dimethylformamide, which process comprises adding dimethylamine to said mixture, heating the mixture at a temperature of between 90° and 180° C. so that the dimethylamine reacts with the formic acid thereby producing additional dimethylformamide and thereafter recovering the dimethylformamide from the heat treated liquid, by distillation.

2. The process of claim 1, wherein the formic acid-dimethylformamide mixture is a bottom residue obtained by the distillation recovery of dimethylformamide which had been used as a solvent.

3. The process of claim 1, wherein the dimethylamine is added in a substantially equimolar amount as that of the formic acid present in the formic acid-dimethylformamide mixture.

4. The process of claim 1, wherein the dimethylamine contains a small amount of water.

5. The process of claim 1, wherein the mixture after addition of the dimethylamine contains less than 30% by weight of water.

6. The process of claim 1, wherein the formic acid-dimethylformamide mixed liquid contains up to 20% by weight of a liquid selected from the group consisting of methanol, ethylene glycol, and mixtures thereof.

7. The process of claim 1, wherein the mixture is heated under an essentially closed environment so as to avoid the escape of dimethylamine from the system.

8. A process for continuously recovering dimethylformamide from crude dimethylformamide which contains large quantities of water and small quantities of formic acid and dimethylamine, respectively, wherein said crude dimethylformamide has been used in the production of acrylic fibers, which process comprises:

(1) distilling said crude dimethylformamide so as to form a first mixture of water and dimethylamine and a second mixture of dimethylformamide and formic acid, (2) distilling said first mixture so as to recover dimethylamine, (3) distilling said second mixture into a first component of pure dimethylformamide and a second component of a dimethylformamide-formic acid mixture wherein formic acid is contained in an amount of less than that required to form an azeotrope with dimethylformamide, (4) admixing dimethylamine recovered in step (2) and said second component from step (3) and heat treating the resulting mixture at a temperature of between 90° C. and 180° C., so that the dimethylamine reacts with the formic acid thereby producing additional dimethylformamide and thereafter, (5) recycling said heat treated liquid obtained from step (4) back to step (1).

9. The process of claim 8, wherein any high boiling materials present in the crude DMF is removed prior to said distillation step (1).

10. The process of claim 8, wherein the heat treatment in the resynthesis step (4) is effected at a temperature of between 120° and 170° C. for a period of between 30 minutes and 3 hours.

11. The process of claim 8, wherein the heat treatment in the resynthesis step (4) is effected so as to reduce the water content of the mixture to an amount of less than 10% by weight.

12. The process of claim 8, wherein the heat treatment in the resynthesis step (4) is effected in a closed system.

13. The process of claim 8, wherein the dimethylformamide-formic acid mixed liquid obtained in step (1) contains from 3 to 10% by weight of formic acid.

References Cited

UNITED STATES PATENTS

| | | | |
|---|---|---|---|
| 3,450,758 | 6/1969 | Greene | 260—561 |
| 3,467,580 | 9/1969 | Weisung et al. | 203—38 |
| 3,468,919 | 9/1969 | Kilsheimer et al. | 260—561 |
| 3,538,159 | 11/1970 | Duffy | 260—561 |

FOREIGN PATENTS

| | | | |
|---|---|---|---|
| 1,110.859 | 4/1968 | Great Britain | 260—561 |

WILBUR L. BASCOMB, JR., Primary Examiner

U.S. Cl. X.R.

203—14, 53, 59, 75, 84; 260—561 R